Figure 1:
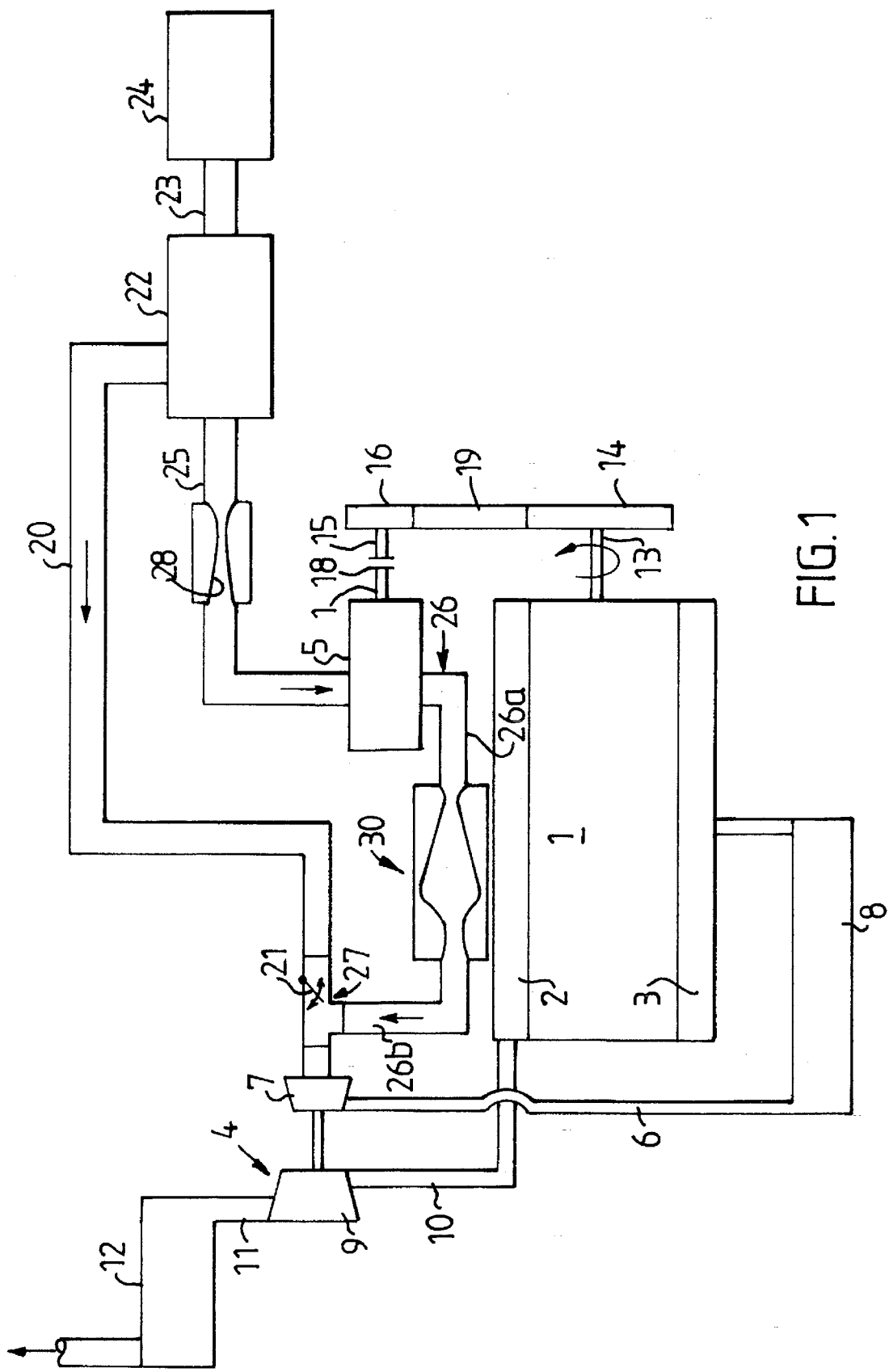

United States Patent [19]
Gobert

[11] Patent Number: 5,615,554
[45] Date of Patent: Apr. 1, 1997

[54] SUPERCHARGED INTERNAL COMBUSTION ENGINE

[75] Inventor: Ulrich Gobert, Hisings Kärra, Sweden

[73] Assignee: AB Volvo, Gothenburg, Sweden

[21] Appl. No.: 607,302

[22] Filed: Feb. 26, 1996

[30] Foreign Application Priority Data

Feb. 24, 1995 [SE] Sweden ................................ 9500695

[51] Int. Cl.$^6$ ........................... F02B 37/04; F01N 1/08
[52] U.S. Cl. ............................................ 60/609; 181/249
[58] Field of Search ..................... 60/609, 610; 181/227, 181/249, 255

[56] References Cited

U.S. PATENT DOCUMENTS

| 161,475 | 12/1926 | Maxim | 181/249 |
| 4,258,550 | 3/1981 | Hinkle et al. | 60/609 |

FOREIGN PATENT DOCUMENTS

WO92/04536  3/1992  WIPO ..................................... 60/609

Primary Examiner—Michael Koczo
Attorney, Agent, or Firm—Young & Thompson

[57] ABSTRACT

A supercharged diesel engine (1) with a mechanical supercharger (5) and a turbocharger (4) connected in series so that the pressure side of the supercharger is connected to the suction side of the turbocharger. The supercharger and the turbocharger each have an intake conduit (20, 25) which exits a common expansion chamber (22). The conduit (25) to the suction side of the mechanical supercharger (5) contains a nozzle (28), whilst the conduit (26) from its pressure side contains a double nozzle with an intermediate expansion chamber (30) which, together with the expansion chamber (22) and the first-mentioned nozzle, serve to suppress noise from the supercharger.

8 Claims, 2 Drawing Sheets

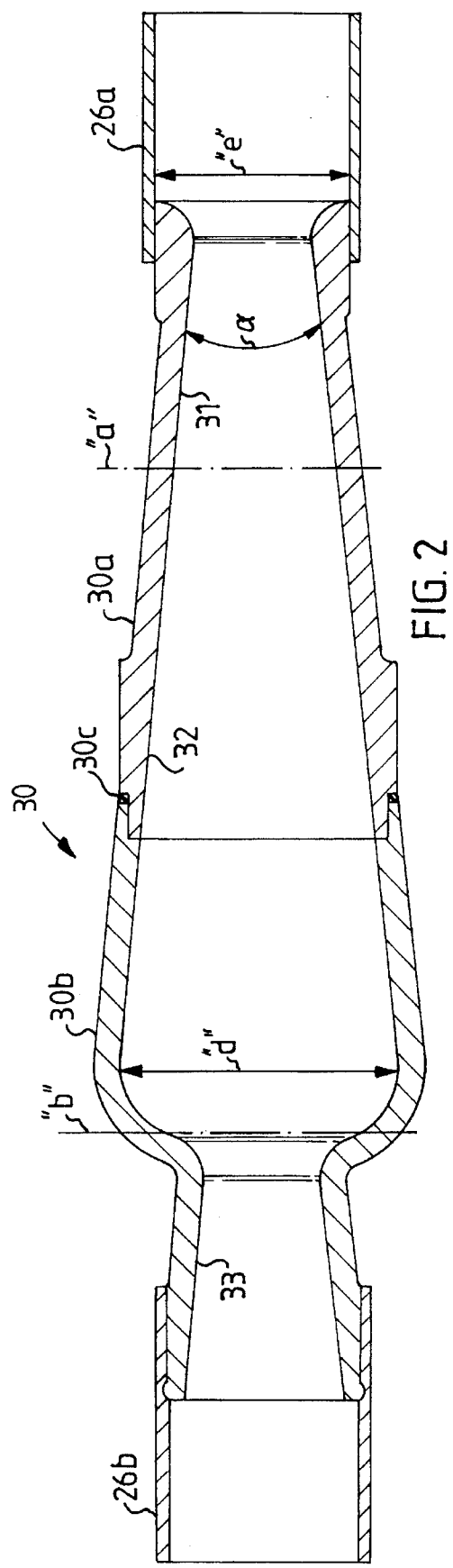

SUPERCHARGED INTERNAL COMBUSTION ENGINE

The present invention relates to a supercharged internal combustion engine comprising an exhaust-driven turbocharger, a supercharger mechanically driven by the engine, the pressure side of the supercharger being connected to the suction side of the turbocharger, and a valve arrangement which is disposed in a conduit connected to the suction side of the turbocharger and connecting the suction side of the turbocharger only to the pressure side of the mechanical supercharger in a first valve position and permitting air supply to the turbocharger past the mechanical supercharger in a second valve position.

It is a known fact that a turbocharged diesel engine always has the drawback that low and mid-range torque is low when the turbocharger is optimised for high boost pressure at high engine speeds to provide the motor with high power. It is also a known fact that the relatively poor boost pressure of a turbocharger at low revs can be compensated for by a mechanically-driven supercharger which is connected in series with the turbocharger in the above stated manner, i.e. the pressure side of the mechanical supercharger is connected to the suction side of the turbocharger. In this manner, a boost pressure is attained on the pressure side of the turbocharger which is the product of the boost pressure of the chargers.

The use of mechanical superchargers in vehicles which are to traffic public roads does, however, create problems with noise suppression since mechanical superchargers produce noise at an unacceptably high level, particularly when used in engines with air intercooling and long and large air systems, i.e. exactly those which arise in turbocharged engines. The noise problem is greatest in engines on the overrun, i.e. with no load and open throttle, because the maximum boost pressure under such conditions greatly exceeds the maximum boost pressure at full load. If the latter is 1.4 bar, the pressure in an engine on the overrun and zero load can be as much as about 1.7 bar.

The large amplitude noise which a mechanical supercharger generates and which arises particularly in the outlet conduit must therefore be suppressed. It is known from SE-A-463 223 to suppress such noise from a screw compressor in, for example, a cooling plant by using a Laval nozzle connected to the inlet or outlet port of the compressor.

The object of the present invention is, starting out from the above mentioned known noise suppression technology, to develop an engine of the type mentioned in the introductory portion which, with simple means which may be mounted in a normal engine compartment in a heavy goods vehicle, exhibits such good noise suppression that it does not create an inconvenience from a comfort point of view.

This is achieved in accordance with the invention by the provision of an intake conduit from an air filter leading into an expansion chamber from which said conduit containing the valve arrangement leads to the suction side of the compressor of the turbocharger and from which a second conduit leads to the suction side of the mechanical supercharger, and in that a conduit containing a first nozzle connects the pressure side of the mechanical supercharger to the suction side of the turbocharger.

Experiments conducted on a diesel engine of six liters swept volume have shown that with such a combination of an expansion chamber on the suction side and a nozzle on the pressure side of the mechanical supercharger, a 1–4 DB(A) noise suppression from the mechanical supercharger can be achieved.

In a further development of the invention, the nozzle leads into a conical expansion chamber, the largest diameter of which is greater than the internal diameter of the conduit before the inlet. The outlet from the chamber is in the form of a nozzle which is identical to the inlet nozzle. Experiments conducted on the above mentioned six-liter engine provided with this double nozzle with intermediate expansion chamber have shown that, with an engine on the overrun, the noise level in the range 800–1500 rpm could be reduced by 4–8 DB(A) compared to an engine without noise suppression for compressor noise.

The invention will be described in greater detail with reference to the embodiments shown in the attached drawings, in which FIG. 1 shows a schematic view of one embodiment of an engine according to the invention and FIG. 2 a longitudinal cross-section through a preferred embodiment of a noise suppression device.

In FIG. 1, reference numeral 1 denotes an internal combustion engine, for example a diesel engine, with an exhaust manifold 2 and an inlet manifold 3. A turbocharger generally denoted by reference numeral 4 and a mechanically driven supercharger 5 of the displacement type feed air through a conduit 6 from the compressor side 7 of the turbocharger 4 and via an air intercooler 8 to the inlet manifold 3 of the motor. The turbine portion 9 of the turbocharger 4 is connected on the inlet side via a conduit 10 to the exhaust manifold 2 and on the outlet side via a conduit 11 to an exhaust system 12. The mechanical supercharger 5 is driven by the engine's crankshaft 13 via a transmission which, in the shown embodiment, is a belt drive comprising a pulley 14 arranged for co-rotation with the crankshaft 13, a pulley 16 arranged for co-rotation with a shaft 15, a clutch mechanism 18 arranged between the shaft 15 and an input shaft 17 to the supercharger 5 and a drive belt 19 running between the pulleys 14, 16.

The compressor portion 7 of the turbocharger 4 is connected on its suction side to a conduit 20 containing a non-return valve 21 opening on the suction side. The conduit 20 runs from an expansion chamber 22 into which a suction conduit 23 leads from the air filter 24 of the engine. A further conduit 25 leads from the expansion chamber 22 and is connected to the inlet of the mechanical supercharger 5. A conduit 26 from the outlet of the supercharger 5 leads to a junction 27 in the conduit 20 downstream of the non-return valve.

The conduit 25 on the inlet side to the supercharger 5 contains a nozzle 28 through which air from the expansion chamber 22 flows to the inlet of the supercharger 5. A nozzle arrangement generally denoted by reference numeral 30 is included in the conduit 25 on the outlet side of the supercharger. The nozzle arrangement is described in greater detail with reference to the preferred embodiment shown in FIG. 2.

The right-hand end of the nozzle arrangement 30 in the drawing is connected to the conduit 26a from the outlet of the mechanical supercharger, whilst the left-hand end is connected to the conduit 26b which leads to the junction 27 in the conduit 20. The nozzle arrangement 30 can in principle be divided into three different portions with continuous transition into each other, namely a first nozzle 31 which extends from the right-hand end of the arrangement in the drawing and up to the parting line "a", a conical expansion chamber 32 which in the shown embodiment has the same cone angle α as the nozzle 31 and which extends from the parting line "a" to the parting line "b", and a second nozzle 33 which is identical to the first nozzle 31 and terminates at the left-hand end of the nozzle arrangement 30. In general, the air velocity should be as great as possible at the minimum cross-section of the nozzles 31, 33 at the same time that the expansion ratio should be as great as possible in the expansion chamber. Limits are, however, imposed by the maximum allowed pressure drop, available space, the capacity of the belt drive 14, 16, 19, etc. Experiments carried out with nozzles 31, 33 and a chamber 32 with a cone angle of about 12° and where the chamber gave an expansion ratio of 1:2, i.e. the largest diameter "d" of the chamber was about 1.4 times the inner diameter "e" of the conduit 26a before the inlet have provided optimal results in terms of noise suppression and performance for a given engine which, in the case in question, was a six-cylinder diesel engine with six liters swept volume. Depending on the type of engine and the noise frequency range which is prioritized for the noise suppression, the above values will vary. In terms of the cone angle α, this can lie between about 10° and 15° and for the expansion ratio 1: about 1.7–2.3, i.e. the largest diameter of the chamber can be 1.3–1.5 times the diameter of the conduit 26a.

The embodiment described in connection with FIG. 1 with an expansion chamber 22, a nozzle 28 on the inlet side of the mechanical supercharger and the arrangement 30 with a double nozzle with intermediate expansion chamber on the outlet side provides maximum noise suppression of noise from the mechanical supercharger 5. Depending on the noise suppression demands and available space in the engine compartment, etc., the nozzle 28 on the inlet side and the nozzle 33 after the conical expansion chamber 32 may be omitted since the expansion chamber 22 and the first nozzle 31 on the outlet side together with the conical expansion chamber have been shown to provide the greatest contribution to the noise suppression.

When the suction requirements of the turbocharger 4 exceed the maximum air capacity of the mechanical supercharger, the non-return valve 21 is opened so that the turbocharger 4 can draw air directly from the expansion chamber 22. In this position, the mechanical supercharger 5 can be disconnected via the clutch 18.

I claim:

1. A supercharged internal combustion engine comprising an exhaust-driven turbocharger, a supercharger mechanically driven by the engine, the pressure side of the supercharger being connected to the suction side of the turbocharger, and a valve arrangement disposed in a conduit connected to the suction side of the turbocharger and connecting the suction side of the turbocharger only to the pressure side of the mechanical supercharger in a first valve position and permitting air supply to the turbocharger past the mechanical supercharger in a second valve position, characterized in that an intake conduit (23) from an air filter (24) leads into an expansion chamber (22) from which said conduit (20) containing the valve arrangement (21) leads to the suction side of the compressor (7) of the turbocharger (4) and from which a second conduit (25) leads to the suction side of the mechanical supercharger, and in that a conduit (26) containing a first nozzle (31) connects the pressure side of the mechanical supercharger to the suction side of the turbocharger.

2. Internal combustion engine according to claim 1, characterized in that a second nozzle (28) is arranged in said conduit (25) between the expansion chamber (22) and the suction side of the mechanical supercharger (5).

3. Internal combustion engine according to claim 1, characterized in that the valve arrangement (21) is a non-return valve which is arranged such that it adopts said second valve position when the pressure on the pressure side of the mechanical supercharger (5) is less than the pressure in the expansion chamber (22).

4. Internal combustion engine according to claim 1, characterized in that the first nozzle (31) on the outlet side leads into a conical chamber (32), the largest diameter ("d") of which is greater than the internal diameter ("e") of the conduit (26) before the inlet into the first nozzle.

5. Internal combustion engine according to claim 4, characterized in that the first nozzle (31) and the chamber (32) have a cone angle of 10°–15° and in that the largest diameter ("d") of the chamber is 1.3–1.5 times the inner diameter ("e") of the conduit (26) before the inlet into the first nozzle.

6. Internal combustion engine according to claim 5, characterized in that the first nozzle (31) and the chamber (32) have a cone angle of about 12°, and in that the greatest diameter ("d") of the chamber is about 1.4 times the inner diameter ("e") of the conduit before the inlet into the first nozzle.

7. Internal combustion engine according to claim 4 characterized in that the chamber (32) has an outlet which is formed by a third nozzle (33).

8. Internal combustion engine according to claim 7, characterized in that the third nozzle has the same cone angle and the same minimum diameter as the first nozzle (31) which forms the inlet to the chamber.

* * * * *